US012717780B2

(12) United States Patent
Wan et al.

(10) Patent No.: US 12,717,780 B2
(45) Date of Patent: Aug. 25, 2026

(54) RETRIEVAL AUGMENTED CLARIFICATION IN INTERACTIVE SYSTEMS

(71) Applicant: International Business Machines Corporation, Armonk, NY (US)

(72) Inventors: Hui Wan, White Plains, NY (US); Sachindra Joshi, Gurgaon (IN); Boaz Carmeli, Koranit (IL); Marina Danilevsky Hailpern, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 18/081,107

(22) Filed: Dec. 14, 2022

(65) Prior Publication Data

US 2024/0202189 A1 Jun. 20, 2024

(51) Int. Cl.
*G06F 16/2452* (2019.01)

(52) U.S. Cl.
CPC .. *G06F 16/24526* (2019.01); *G06F 16/24522* (2019.01)

(58) Field of Classification Search
CPC ..................... G06F 16/24526; G06F 16/24522
See application file for complete search history.

(56) References Cited

U.S. PATENT DOCUMENTS 8,484,190 B1 7/2013 Igarashi et al.
10,586,155 B2 3/2020 Cook et al.
10,740,402 B2 8/2020 Rana et al.
10,747,761 B2 8/2020 Zhong et al.
2015/0081603 A1* 3/2015 Agrawal ............. G06F 16/9537 706/12
2015/0317320 A1* 11/2015 Miller ............... G06F 16/90324 707/728
2016/0019292 A1* 1/2016 Rezaei .................. G06F 16/951 707/722
2020/0380991 A1* 12/2020 Ge .......................... G10L 15/22

(Continued)

OTHER PUBLICATIONS

Neng Zhang et al., "Chatbot4QR: Interactive query refinement for technical question retrieval," IEEE Transactions on Software Engineering, 2020 (28 pages).

(Continued)

*Primary Examiner* — Khanh B Pham
*Assistant Examiner* — Ranjit P Doraiswamy
(74) *Attorney, Agent, or Firm* — Steven M. Bouknight

(57) ABSTRACT

Techniques for generating a clarification to distinguish among retrieved content in interactive systems are provided. In one aspect, a method for generating a clarification prompt in an interactive system includes: obtaining a training dataset for generating the clarification prompt from existing question-answering datasets by modifying original queries in the existing question-answering datasets to obtain training examples of under-specified queries; and training a machine learning model using the training dataset how to select latent differentiating factors in content candidates obtained from an under-specified query from a user and, based on the latent differentiating factors, generate the clarification prompt to clarify an intent of the user.

17 Claims, 6 Drawing Sheets

(56) References Cited

U.S. PATENT DOCUMENTS

2021/0191925 A1* 6/2021 Sianez .................. G06N 20/00
2021/0406735 A1* 12/2021 Nahamoo ............ G06F 40/247

OTHER PUBLICATIONS

Disclosed Anonymously, "System and Method for Intercepting Redundant Multichannel Communications," IPCOM000265272D (Mar. 2021) (3 pages).
Disclosed Anonymously, "Method and System for Dynamic UI Creation for AI Chatbot," IPCOM000265243D (Mar. 2021) (6 pages).
Disclosed Anonymously, "Multi-round chat bot system for self-service restores in an enterprise environment," IPCOM000263889D (Oct. 2020) (5 pages).
Disclosed Anonymously, "System and Framework for Facilitating Faceted Interaction with Data from Different Data Sources," IPCOM000199917D (Sep. 2010) (23 pages).
Claudio Carpineto et al., "A Survey of Automatic Query Expansion in Information Retrieval," ACM computing Surveys, vol. 44, issue 1 (Jan. 2012) (56 pages).
Chiori Hori, et al., "Deriving Disambiguous Queries in a Spoken Interactive ODGA System," ICASSP 2003 (Apr. 2003) (4 pages).
Jian Wang et al., "Template-guided Clarifying Question Generation for Web Search Clarification," CIKM'21 (Nov. 2021) (5 pages).
Ivan Sekulic et al., "Towards Facet-Driven Generation of Clarifying Questions for Conversational Search," ICTIR '21, pp. 167-175 (Jul. 2021).
Zhiling Zhang et al., "Diverse and Specific Clarification Question Generation with Keywords," arXiv:2104.10317v1 (Apr. 2021) (11 pages).
Mohammad Aliannejadi et al., "Building and Evaluating Open-Domain Dialogue Corpora with Clarifying Questions," arXiv:2109.05794v1 (Sep. 2021) (12 pages).
Mohammad Aliannejadi et al., "ConvA13: Generating Clarifying Questions for Open-Domain Dialogue Systems (ClariQ)," arXiv:2009.11352v1 (Sep. 2020) (6 pages).
R.K. Roul et al., "An Effective Information Retrieval for Ambiguous Query," arXiv:1204.1406v1 (Apr. 2012) (11 pages).
Cheng Luo et al., "Query Ambiguity Identification Based on User Behavior Information," Airs 2014 (12 pages).
Hamed Zamani et al., "Generating Clarifying Questions for Information Retrieval," WWW'20: Proceedings of the Web Conference 2020 (Apr. 2020) (11 pages).
Mohammad Aliannejadi et al., "Asking Clarifying Questions in Open-Domain Information-Seeking Conversations," arXiv:1907.06554v1 (10 pages).
Muuo Wambua et al., "Interactive search through iterative refinement," CAIR'18 (Jul. 2018) (10 pages).
Wenjie Ou et al., "A Clarifying Question Selection System from NTES_Along in Convai3 Challenge," arXiv:2010.14202v3 (Nov. 2020) (7 pages).
Poonpong Boonbrahm et al., "Using Augmented Reality Interactive System to Support Digital Electronics Learning," International Conference on Learning and Collaboration Technologies, LCT 2017 (May 2017) (9 pages).

* cited by examiner

RETRIEVAL AUGMENTED CLARIFICATION IN INTERACTIVE SYSTEMS

FIELD OF THE INVENTION

The present invention relates to retrieval augmented machine learning, and more particularly, to techniques for generating a clarification to distinguish among retrieved content in interactive systems.

BACKGROUND OF THE INVENTION

Retrieval augmented systems have been successfully applied to real-world applications, especially natural language processing tasks. Doing so typically involves retrieving text from a large collection of content, and using the retrieved text to assist in natural language processing tasks. For example, with dialog systems, retrieving relevant knowledge-informed text helps to generate more informative and factually-correct conversations.

The performance of such systems can, however, depend on the user input. For instance, if the query provided by a user is under-specified or ambiguous, then the system cannot precisely identify the user intent, potentially making the retrieved content very diverse. In that case, it is very difficult for the system to then find the proper answer the user is looking for.

Therefore, techniques for clarifying and specifying the user intent in retrieval augmented systems would be desirable.

SUMMARY OF THE INVENTION

The present invention provides techniques for generating a clarification to distinguish among retrieved content in interactive systems. In one aspect of the invention, a method for generating a clarification prompt in an interactive system is provided. The method includes: obtaining a training dataset for generating the clarification prompt from existing question-answering datasets by modifying original queries in the existing question-answering datasets to obtain training examples of under-specified queries; and training a machine-learning model using the training dataset how to select latent differentiating factors in content candidates obtained from an under-specified query from a user and, based on the latent differentiating factors, generate the clarification prompt to clarify an intent of the user.

For instance, the training dataset can be obtained by: obtaining a parse tree of an original query q from the existing question-answering datasets; and modifying the original query q to obtain a modified query q' that meets a given criteria. The original query q can be modified by dropping a modifier from the original query q, or by generalizing a part of the original query q through a knowledge-based hierarchy.

The content candidates can then be retrieved for an under-specified query from the user. Properties can be extracted from the content candidates. The machine-learning model, which has been trained using the training dataset, can then be used to select one or more of the properties as differentiating factors amongst the content candidates which can be used to generate the clarification prompt to clarify the intent of the user.

A more complete understanding of the present invention, as well as further features and advantages of the present invention, will be obtained by reference to the following detailed description and drawings.

DETAILED DESCRIPTION OF PREFERRED EMBODIMENTS

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
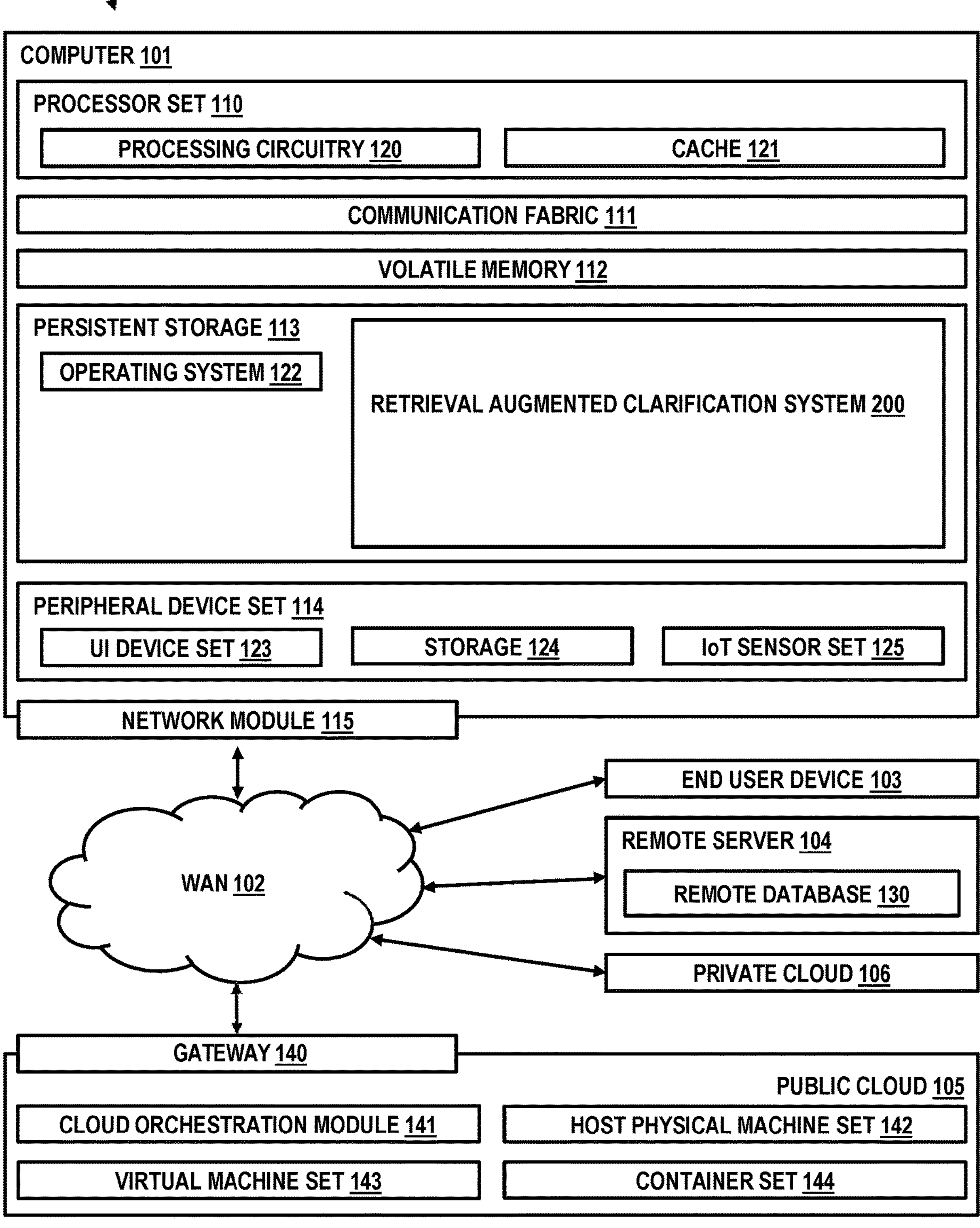
FIG. 1 is a diagram illustrating an exemplary computing environment according to an embodiment of the present invention.

Referring to FIG. 1, computing environment 100 contains an example of an environment for the execution of at least some of the computer code involved in performing the inventive methods, such as retrieval augmented clarification system 200. In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in system 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As highlighted above, an under-specified user query makes it difficult for retrieval augmented systems to precisely identify the user intent. As a result, the content retrieved by the system can be very diverse, and may not include the answer the user is looking for. Advantageously, provided herein are techniques for clarifying the user intent to enhance the usability of retrieval augmented systems. Namely, an overall goal of the present techniques is to generate a clarification that best distinguishes amongst the retrieved content in order to provide the answer the user is looking for. The term 'clarification' as used herein generally refers to any information that sheds light on the intent of the user posing the query, and can be used by the system to select which of the retrieved content to provide as an answer to the user.

For instance, according to an exemplary embodiment, upon receipt of an under-specified query from the user, the system may ask the user a follow-up question (or questions) via an interactive user interface. By "under-specified" it is meant that the query lacks sufficient detail to definitively select a gold answer from retrieved content, in other words it is ambiguous. Asking a follow-up question is a very straightforward approach to obtain clarification directly from the user. To use an illustrative, non-limiting example, suppose the user asks for the lowest recorded temperature in a particular town, however there are multiple towns with the same name. This query is under-specified (i.e., ambiguous) as further information is needed in order to provide the proper answer. In that case, the system may ask a follow-up question inquiring, for example, as to the location (e.g., state) the user is inquiring about.

Similar to asking a follow-up question, in another exemplary embodiment the system presents the user with different options from which, again through an interactive user interface, the user can select to clarify the query. For instance, using the same example as above, rather than asking a follow-up question, the system may instead present the user with the various states having cities or towns with that name in common. The user can then click on or otherwise select the intended location/state.

In yet another exemplary embodiment, the system can leverage other information to obtain clarification on the user query. For instance, the user might provide the system with the user's current location. For instance, again using the same example as above, the user may give a current location as one of the commonly named cities or towns in a particular state. The system can then apply that information to clarify the query.

Figure 2:
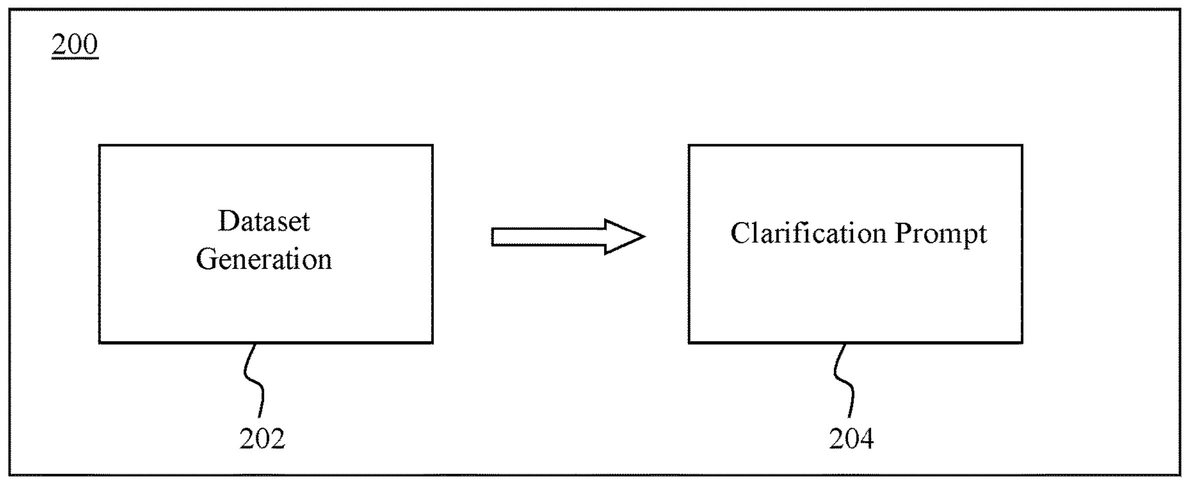
FIG. 2 is a diagram providing a general overview of a retrieval augmented clarification system according to an embodiment of the present invention.

FIG. 2 is a diagram providing a general overview of the present retrieval augmented clarification system 200 in accordance with the present techniques. As shown in FIG. 2, system 200 includes a dataset generation module 202 and a clarification prompt module 204. As will be described in detail below, the dataset generation module 202 creates a training dataset with under-specified, i.e., ambiguous, queries from existing curated question-answering datasets by dropping some modifier from the query, or by generalizing the query in some other way such as through a knowledge base. Advantageously, using existing question-answering datasets reduces the human effort involved in composing the heuristics. The dataset generated by module 202 will then be used to train a machine learning model for generating clarification prompts.

Specifically, the clarification prompt module 204 uses machine learning and the training dataset from module 202 to select latent differentiating factors and generate clarification prompts such as a follow-up question (see above) in a natural language form that is highly customized for each query and corpus (i.e., collection of written texts). Namely, as will be described in detail below, the present approach treats these differentiating factors as latent (i.e., undetermined) variables, and uses machine learning techniques to learn from the training dataset how to select the latent differentiating factors. An overall goal of the present techniques is to generate the best clarification prompt such as by asking the best clarification question based on content retrieved from an original under-specified query posed by the user.

Figure 3:
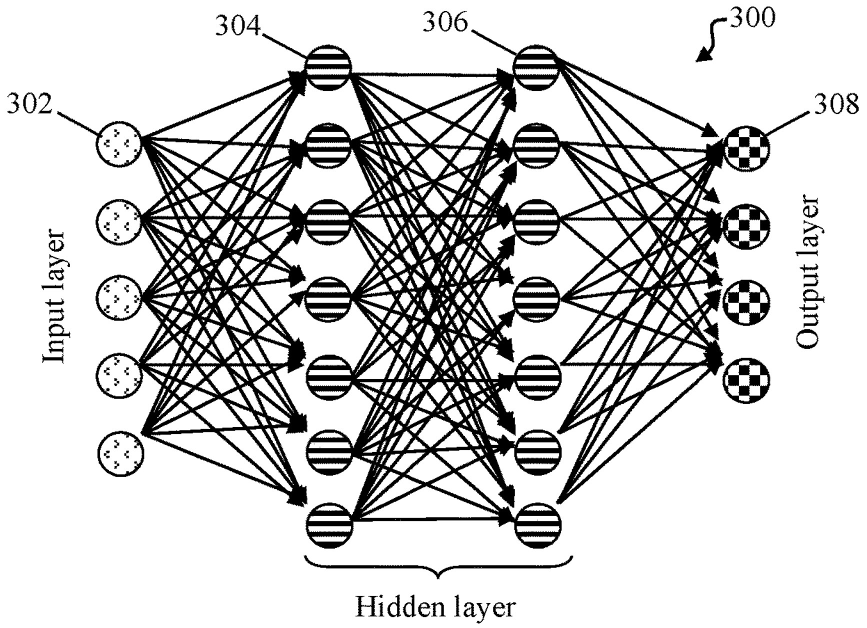
FIG. 3 is a diagram illustrating an exemplary neural network according to an embodiment of the present invention.

In some embodiments, the machine learning model employed is a neural network. In machine learning and cognitive science, neural networks are a family of statistical learning models inspired by the biological neural networks of animals, and in particular the brain. Neural networks may be used to estimate or approximate systems and cognitive functions that depend on a large number of inputs and weights of the connections which are generally unknown. Neural networks are often embodied as so-called "neuromorphic" systems of interconnected processor elements which act as simulated "neurons" that exchange "messages" between each other in the form of electronic signals. See, for example, exemplary neural network 300 shown in FIG. 3 that includes a plurality of interconnected processor elements 302, 304/306 and 308 that form an input layer, at least one hidden layer, and an output layer, respectively, of the neural network 300. The connections in neural networks that carry electronic messages between simulated neurons are provided with numeric weights that correspond to the strength or weakness of a given connection. These numeric weights can be adjusted and tuned based on experience, making neural networks adaptive to inputs and capable of learning. Typically, neural networks are trained on labeled sets of training data. Once trained, the neural network can be used for inference. Inference applies knowledge from a trained neural network model and uses it to infer a result. A fully connected layer (typically the last or last few layers in a neural network) is a layer where all of the inputs from one layer are connected to every activation unit of the next layer. The fully connected layer(s) compile the data extracted by previous layers of the neural network to form the final output.

Given the above overview, the present retrieval augmented clarification system is now described in detail by way of reference to methodology 400 of FIG. 4 for generating a clarification prompt in retrieval augmented clarification system 200 which, for clarity, will be described in conjunction with FIG. 5 which is a diagram illustrating the process for creating a training dataset with under-specified/ambiguous queries from existing question-answering datasets, and FIG. 6 which is a diagram illustrating the process for using the training dataset (of FIG. 5) to train a machine learning model to select latent differentiating factors and generate clarification prompts.

The first task is to obtain a training dataset from existing question-answering datasets. As highlighted above, this training dataset will be used by a machine learning model to learn how to select latent differentiating factors in order to generate the best clarification prompts. In general, the existing question-answering datasets (many of which are publicly available) contain query-answer pairs. The process begins with the query q component of the query-answer pairs. As will be described in detail below, the query q will be modified to make it more unclear. Thus, for clarity, the term 'original query q' will be used herein to refer to an (unmodified) query q obtained from the existing question-answering datasets, and the term 'modified query q'' will be used herein to refer to a query q that has been modified to make it more unclear (i.e., ambiguous) using, for example, the techniques described below.

Figure 4:
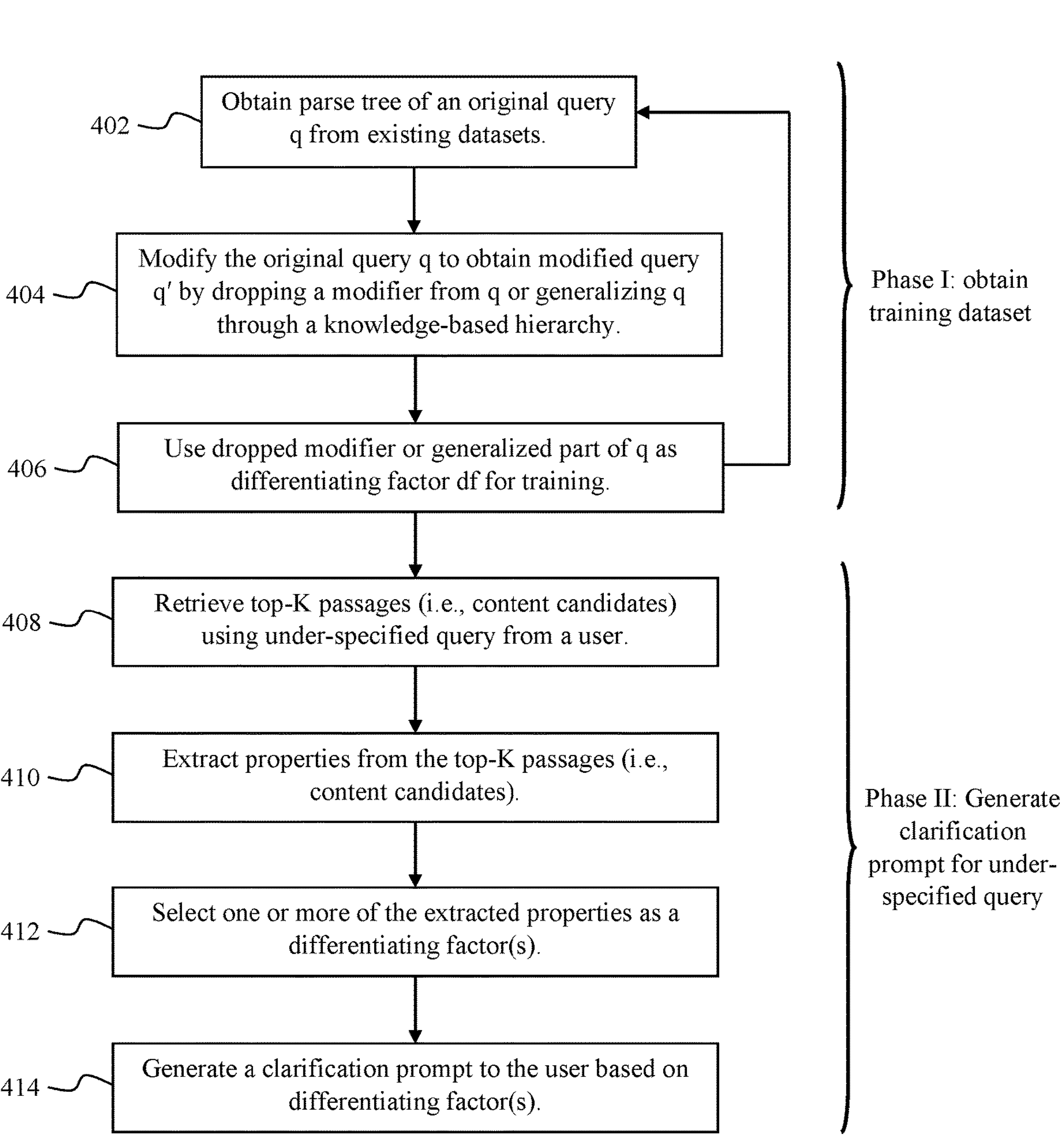
FIG. 4 is a diagram illustrating an exemplary methodology for generating a clarification prompt in a retrieval augmented system according to an embodiment of the present invention.

Thus, referring to methodology 400 of FIG. 4, the process begins with an original query q from the existing question-answering datasets, and in step 402 a parser is used to obtain a parse tree of the original query q. A parse tree is an ordered tree structure with a root and leaf nodes that can be used to represent the syntactic structure of words in a natural language phrase or sentence based on the rules for forming grammatical sentences. In natural language processing, a parser is a machine learning process that is used to assign these syntactic structures to input phrases or sentences according to grammar.

In step 404, the original query q is modified to make it more unclear in order to obtain the modified query q', which will be used as a training example of an under-specified query when training the machine learning model. As will be described in detail below, this can be done in a number of ways. Notwithstanding, with whichever approach is used, the modified query q' needs to meet certain criteria. The first criteria is that the top-K list of passages retrieved using the modified query q' is significantly different from the top-K list of passages retrieved using the original query q.

For instance, according to an exemplary embodiment, the first criteria is met if the F1 score between the top-K list of passages retrieved using the original query q and the top-K list of passages retrieved using the modified query q' is below a certain (e.g., user-defined) threshold. An F1 score (also sometimes referred to as an F-score) is a statistical metric often used in deep learning as a measure of the accuracy of a model on a dataset. Thus, the goal is to modify the original query q to q' by making it more unclear in order to cause a drop in the accuracy when answering the modified query q' as compared to the original query q.

However, the second criteria is that the modified query q' cannot be so general that it becomes too ambiguous for training purposes. For instance, according to an exemplary embodiment, the second criteria is met if the top-K list of passages retrieved using the modified query q' includes the gold answer (although it might be lower down on the list as compared to the top-K list of passages retrieved using the original query q). To look at it another way, the original query q should not be made so unclear that the retrieved content becomes too diverse and the gold answer falls out of the list of top-K passages. By 'gold answer' it is meant the retrieved passage that contains the correct answer to the original query q.

According to another exemplary embodiment, the second criteria is met if the language model score shows the modified query q' to be a natural language question. Namely, a language model can be used to evaluate the probability of a sequence of words based, for example, on grammar, to predict the probably grammatical correctness of the sequence of words in forming a sentence by measuring how likely each word is to follow the prior word, and then aggregating the probabilities. Through this score, it can be determined whether the modified query q' is a natural language sentence (and thus meets the second criteria), or is simply just a non-meaningful sequence of words.

As highlighted above, the modification of the original query q to obtain the modified query q' can be performed in a couple of different ways. For instance, in one exemplary embodiment, a modifier is dropped from the original query q to obtain the modified query q'. For instance, one of the leaf nodes can be dropped from the parse tree (see step 402) of the original query q to obtain the modified query q'. An example of this approach will be given below.

Alternatively, in another exemplary embodiment, a part of the original query q is generalized through a knowledge-based hierarchy to obtain the modified query q'. For instance, to use an illustrative, non-limiting example, if the original query q is ' What is the average national price of a split-level ranch built before 1980?,' the (generalized) modified query might be ' What is the average national price of a house?' Namely, the part of the original query q 'split-level ranch built before 1980' is replaced by the more general 'house.'

Further, in addition to q and q', the dropped modifier or generalized part of the original query q can be used as a differentiating factor df for training purposes. See step 406. The term 'differentiating factor' (also referred to herein as a 'differentiator') refers to an attribute that can be used to differentiate among the retrieved content. As will be described in detail below, differentiating factors will be used by the machine learning model to generate clarification prompts. According to an exemplary embodiment, the dropped modifier or the entity type T of the generalized part of the original query q is provided as a differentiating factor to a language model which is then used to generate a clarification question conditioned on q and q'. T is the entity type of the generalized part of the original query q. For instance, using the example from above, if the generalized part of the original query q is 'split-level ranch built before 1980,' it's entity type is 'house.'

As shown in FIG. 4, steps 402-406 are repeated for each original query q in the existing question-answering dataset. The goal is to produce a training dataset of original queries q that are clear and unambiguous, and corresponding modified queries q' that are underspecified, i.e., ambiguous. As will be described in detail below, these training examples will be used by a machine learning model to learn how to select latent differentiating factors in content candidates obtained from an under-specified query from a user and, based on those latent differentiating factors, generate a clarification prompt such as a follow-up question to the user that best clarifies the intent of the user. For instance, according to an exemplary embodiment, one training example is composed of: q, q', and the differentiating factor df (from dropped modifier/type T).

Figure 5:
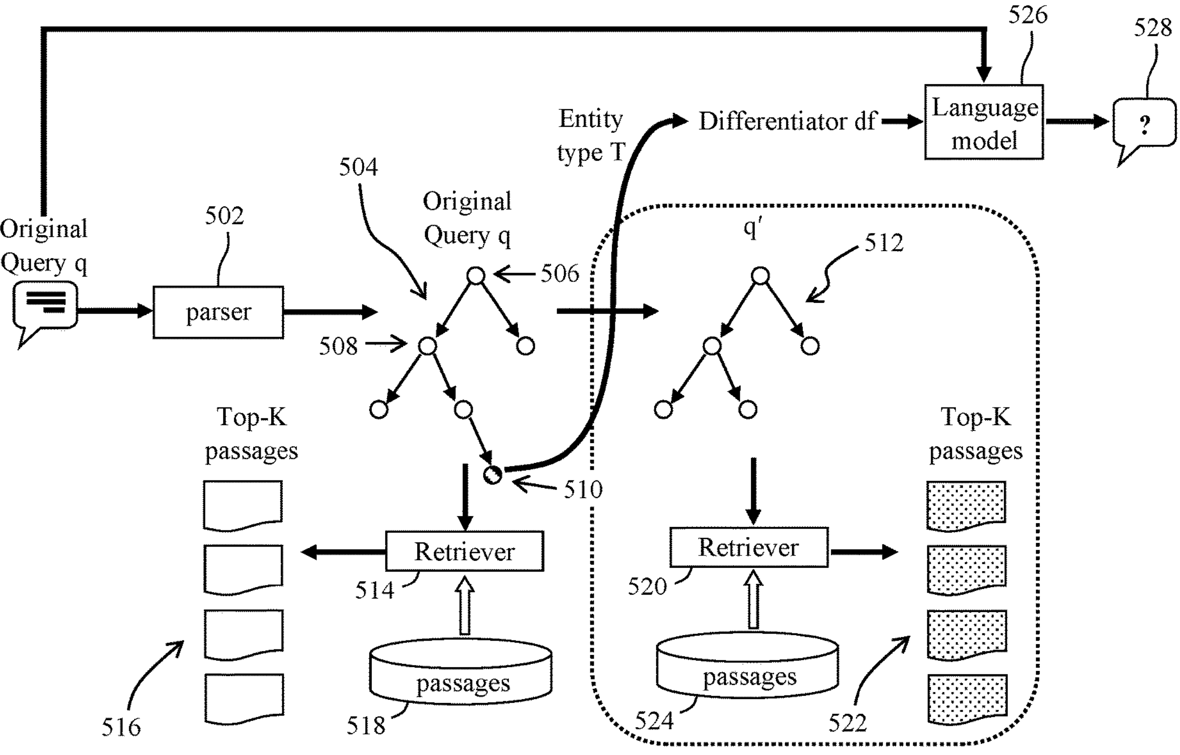
FIG. 5 is a diagram illustrating an exemplary methodology for creating a training dataset with under-specified/ambiguous queries from existing question-answering datasets according to an embodiment of the present invention.

An exemplary implementation of steps 402-406 is illustrated in FIG. 5. Namely, as shown in FIG. 5, given an original query q from an existing question-answering dataset, a parser 502 is used to obtain a parse tree 504 of the original query q in accordance with step 402 of methodology 400 of FIG. 4 (see above). Circles are used to denote the nodes in parse tree 504, where each node is either a root node 506, a branch node 508 or a leaf node 510.

As described in conjunction with the description of step 404 of methodology 400 of FIG. 4 above, the original query q is modified to obtain the modified query q'. The goal is to make the modified query q' more unclear/ambiguous than the original query q. As illustrated in FIG. 5, this can be done by dropping a modifier from the original query q. In this particular example, the leaf node 510 is dropped from parse tree 504 in order to produce the modified query q' which, in the same manner as above, can be used to obtain (modified) parse tree 512. As provided above, the modified query q' can also be obtained by generalizing a part of the original query q through a knowledge-based hierarchy.

With whichever approach is used to obtain the modified query q', that modified query q' must meet certain criteria. A first one of these criteria is that the top-K list of passages retrieved using the modified query q' is significantly different from the top-K list of passages retrieved using the original query q. Namely, as shown in FIG. 5, a retriever 514 retrieves passages 516 from a corpus 518 using the original query q. Similarly, a retriever 520 retrieves passages 522 from a corpus 524 using the modified query q'. In one embodiment, retrievers 514 and 520 are neural network-based algorithms that search for and access relevant knowledge in corpus 518 and 524, respectively. Corpus 518 and 524 can generally be any text repository such as an Internet-based, publicly available encyclopedia. According to an exemplary embodiment, the first criteria is met if the F1 score between the top-K passages 516 retrieved by retriever 514 using the original query q and the top-K passages 522 retrieved by retriever 520 using the modified query q' is below a given threshold. As provided above, the goal is to modify the original query q to q' by making it more unclear in order to cause a drop in the accuracy when answering the modified query q' as compared to the original query q. A list of the passages 516/522 retrieved by retriever 514/520 is ordered based on the relevance of the passages 516/522, and the term 'top-K' refers to the top, e.g., K=1, 2, 3, 4, 5, etc., passages 516/522 in the list.

As provided above, a second criteria that must be met is that the modified query q' cannot be so general that it becomes too ambiguous for training purposes. For instance, according to an exemplary embodiment, the second criteria is met if the top-K list of passages 522 retrieved using the modified query q' includes the gold answer (although it might be lower down on the list as compared to the top-K list of passages 516 retrieved using the original query q). Alternatively, the second criteria may also be met if the language model score shows that the modified query q' is a natural language question.

As described in conjunction with the description of step 406 of methodology 400 of FIG. 4 above, the dropped modifier (e.g., leaf node 510) or generalized part of the original query q can be used as a differentiating factor df for coarse pre-training purposes. Namely, as shown in FIG. 5, the dropped modifier or the entity type T of the generalized part of the original query q can be provided as a differentiating factor df to a language model 526 which is then used to generate a clarification question 528 conditioned on q and q'. According to an exemplary embodiment, the language model 526 is a sequence-to-sequence (Seq2Seq) natural language model.

Now that clear/unambiguous (i.e., original queries) and unclear/under-specified (i.e., modified queries) training examples have been obtained, the next phase of the process is to then use these training examples to train a machine learning model to generate a clarification prompt based on an actual under-specified (i.e., ambiguous) query from a user in order to best clarify the intent of the user. As will be described in detail below, latent differentiating factors selected from the top-K content candidates retrieved using the under-specified (user) query will be provided to the (trained) machine learning model along with the original under-specified (user) query for the machine learning model to generate the clarification prompt.

Specifically, referring back to methodology 400 of FIG. 4, in step 408 a (neural network-based) retriever is used to retrieve the top-K passages from a corpus using an under-specified, i.e., ambiguous, query from the user. Presumably, the gold answer to the user's query is contained in these top-K passages. However, because the user's query is under-specified, further clarification from the use is needed to pick the correct answer. Thus, at this point in the process, the contents in these top-K passages are candidate answers to the user's query. As such, the passages retrieved in step 408 may also be referred to herein as content candidates. It is notable that the top-K passages retrieved in step 408 may also contain meta information, such as document title, section title, etc. According to an exemplary embodiment, this meta information will be used to differentiate amongst the content candidates.

In step 410, a property extractor is used to extract properties from the top-K passages/content candidates. As will be described in detail below, the (trained) machine learning model will then select one or more of these properties to use as differentiating factors. As highlighted above, a differentiating factor is an attribute that can be used to differentiate amongst the retrieved content—in this case the top-K passages retrieved in step 408. According to an exemplary embodiment, the properties extracted from the top-K passages/content candidates include, but are not limited to, titles, modifiers, properties, slots, etc. For example, a passage/content candidate might include property {year: 1982} in its title, or the content can be a JSON object which has attribute {geo: US}, or the content can be a dialogue which has slot {merchandise_category: books}, or the content might have modifier {season: winter} in a sentence. The notion here is that the extracted properties can be used to highlight differences amongst the top-K passages. For instance, if the query relates to the weather in the user's town, then location information extracted from the top-K passages by the property extractor can be used to differentiate amongst the retrieved content candidates. The (trained) machine learning model will then be used to select the best property or properties to use as the differentiating factor, i.e., the clarification property that best distinguishes amongst the retrieved content candidates based specifically on the user's under-specified query. For instance, again using the example of the weather in the user's town, the machine-learning model might select location as the best differentiating factor, even though the top-K passages may differ in other ways, since the user's query is directed to weather at a particular location.

In one exemplary embodiment, the property extractor is a neural network-based algorithm that identifies key properties in text documents. For instance, by way of example only, the property extractor can identify information such as such as titles, modifiers, properties, slots, etc. in the top-K passages using key word lists, grammar and/or context rules.

In step 412, the machine learning model (trained on the training dataset) is then used to select the one or more properties from step 410 that best distinguish amongst the top-K passages given the particular under-specified query from the user. These one or more properties selected in step 412 are the differentiating factor(s) that will be used to create a clarification prompt to the user. Advantageously, as highlighted above, by taking into account the particular query at hand, a more meaningful selection of the differentiating factor(s) in the top-K passages can be made. For instance, the top-K passages may contain additional information that is wholly unrelated to the user's query. However, using this information out of the context of the user's actual query might result in a clarification prompt that is confusing to the user. For example, if the user asks "what's the lowest temperature recorded in Springfield U.S.?" this query is under-specified since there are multiple cities/towns in the U.S. named Springfield. Thus, the retrieved content candidates would likely include weather information for different places in the U.S. named Springfield. Given such an under-specified query, a meaningful follow-up clarification question might be "The Springfield in what State?" or a clarification prompt listing the towns/cities named Springfield along with the corresponding State, from which the user can select. However, the retrieved content candidates may also differ in terms of the meteorological conditions they describe such as snowfall totals, rainfall amounts, etc. These differences are, however, largely unrelated to the original user query.

According to an exemplary embodiment, the differentiating factor(s) are selected in step 412 using disambiguation ability as a metric. The term 'disambiguation ability' generally refers to the overall success of a given one of the extracted properties in distinguishing between the content candidates, thereby reducing ambiguity amongst the content choices. In one embodiment, disambiguation ability is quantified using information gain. In machine learning, information gain refers to a reduction in entropy or randomness in a dataset. More specifically, information gain quantifies the amount of information gained about a random variable from observing another random variable. Thus, the property selected in step 412 as a differentiating factor can be that which provides the greatest information gain amongst all of the extracted properties.

In step 414, the differentiating factor selected in step 412 is then used by the machine learning model to generate the clarification prompt to the user. For instance, using the above example of the under-specified query "what's the lowest temperature recorded in Springfield U.S.?" the follow-up question "The Springfield in what State?" might be generated in step 414, or a clarification prompt listing the towns/cities named Springfield along with the corresponding State might be generated in step 414, from which the user can select.

Figure 6:
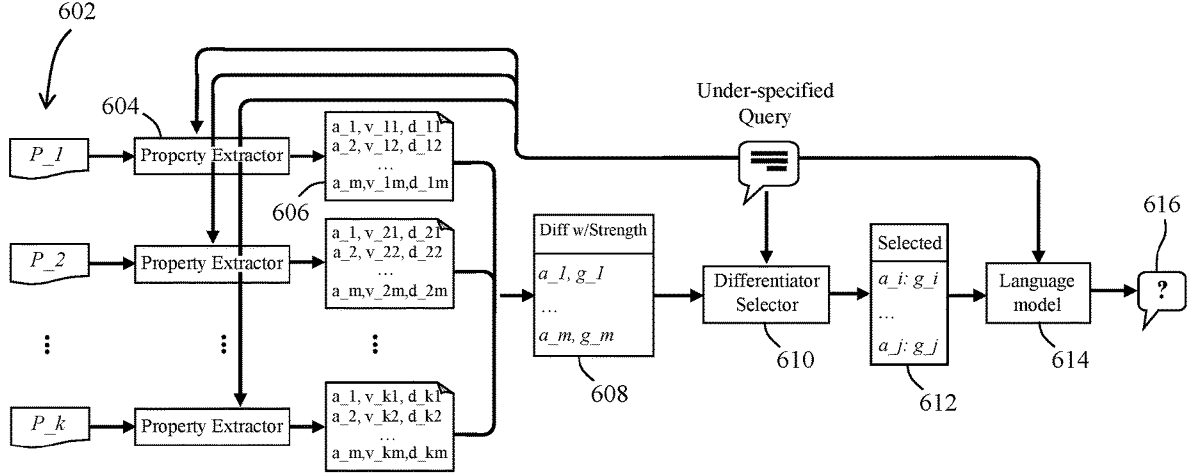
FIG. 6 is a diagram illustrating an exemplary methodology for using a machine-learning model, trained on the training dataset of FIG. 5, to select latent differentiating factors and generate clarification prompts according to an embodiment of the present invention.

An exemplary implementation of steps 408-414 is illustrated in FIG. 6. Namely, as shown in FIG. 6, the top-K passages 602, i.e., P_1, P_2, . . . , P_k, are retrieved from a corpus based on an under-specified query from the user in accordance with step 408 of methodology 400 of FIG. 4 (see above). As explained above, these top-K passages 602 may also be referred to herein generally as content candidates. Namely, while the gold answer to the query may be contained in these top-K passages 602, the query is under-specified (i.e., ambiguous) and thus further clarification from the user is needed to select the correct retrieved content as the answer. Take for instance, the under-specified user query "what's the lowest recorded temperature in Springfield U.S.?" which is ambiguous since there are multiple cities/towns in the U.S. named Springfield. If the user's intent is to know the current temperature in Springfield, Massachusetts, the requested information may be contained in the top-K passages 602, however further elaboration is needed from the user. This will include prompting the user for further clarification.

To do so, property extractors 604 are used to extract properties 606 from the top-K passages 602 in accordance with step 410 of methodology 400 of FIG. 4 (see above). For instance, in this particular example, a: is attribute or property, such as "location", v: is value for the property, such as "Massachusetts", and d: is confidence of the machine learning model on the property-value extraction. According to an exemplary embodiment, the properties 606 extracted from the top-K passages 602 include, but are not limited to, titles, modifiers, properties, slots, etc. As shown in FIG. 6, the under-specified query can be used to guide extraction of the properties from the top-K passages 602. For instance, if the under-specified query contains information such as names of places and temperature, then the property extractors 604 can look for properties related to meteorological conditions at particular locations. Notably, this is done in the interest of finding differentiating factors to best clarify the intent of the user in posing the query, rather than some other unrelated differences that may exist amongst the top-K passages 602.

Of course, not all of the extracted properties 606 will help differentiate amongst the top-K passages 602, and of those that do, some may be more helpful than others. Thus, the extracted properties 606 are summarized along with their corresponding strength (see block 608). As provided above, a: is attribute or property, and g: is disambiguation ability, such as defined by information gain. The term 'strength' refers to the disambiguation ability of each extracted property 606 in differentiating between the top-K passages 602. As described above, information gain is one metric contemplated herein for quantifying the disambiguation ability.

A differentiating factor selector 610 component of the machine learning model is then used to select one or more of the properties 606 as differentiating factors based on the under-specified query in accordance with step 412 of methodology 400 of FIG. 4 (see above). As highlighted above, use of the query itself in making the selection, helps pinpoint the most meaningful factors to distinguish amongst the content candidates, rather than some other differences that may exist amongst the top-K passages 602 but are unrelated to the query at hand.

The differentiating factors 612 selected by selector 610 are then provided to a language model 614. According to an exemplary embodiment, the language model 614 is a sequence-to-sequence (Seq2Seq) natural language model. The language model 614 then uses the differentiating factors 612 to generate a clarification prompt conditioned on the under-specified query in accordance with step 414 of methodology 400 of FIG. 4 (see above). For instance, using the above example of the under-specified query "what's the lowest temperature recorded in Springfield U.S.?" the language model 614 might generate the follow-up question "The Springfield in what State?," or the language model 614 might generate a clarification prompt listing the towns/cities in the U.S. named Springfield along with the corresponding State, from which the user can select.

Figure 7:
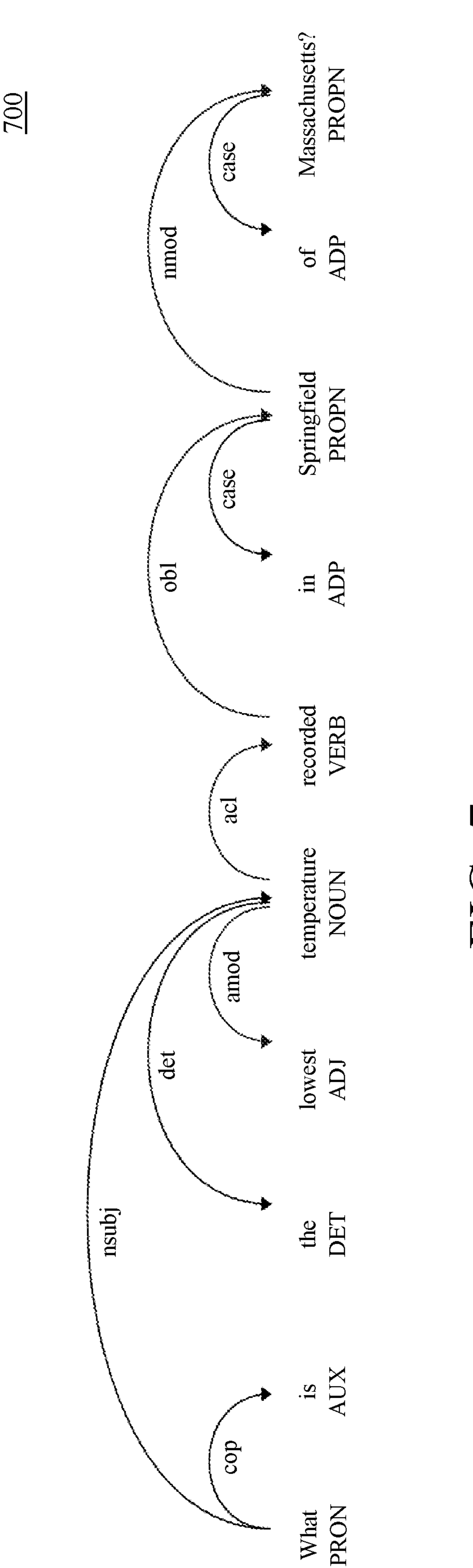
FIG. 7 is a diagram illustrating an exemplary parse tree according to an embodiment of the present invention.

The present techniques are further described by way of reference to the following non-limiting example. FIG. 7 is a diagram illustrating an exemplary parse tree 700 for a query q "what is the lowest temperature recorded in Springfield of Massachusetts?" Query q might be found in an existing question-answering dataset. As described in conjunction with the description of step 404 of methodology 400 of FIG. 4 above, such a query is modified in order to obtain an example of an under-specified query that can be used to train the machine-learning model. To do so, a modifier can be dropped from the original query q to obtain a modified (under-specified) query q'. The dropped modifier is always a leaf node of the parse tree. For instance, in the instant example, the leaf node modifier "of Massachusetts" can be dropped from parse tree 700. The resulting modified query q' "what is the lowest temperature recorded in Springfield?" is unclear/ambiguous since there are multiple cities/towns with the name Springfield.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method comprising:

training a machine learning model to generate a clarification prompt in an interactive system, wherein the training further comprises:

modifying an original query q in an existing question-answering dataset to generate a modified query q', wherein the modified query q' further comprises an under-specified query that is unclear based on modification of the original query;

retrieving a top-K list of passages associated with the original query q and the modified query q';

determining, based on the retrieved top-K list of passages, that the modified query q meets a first criteria and a second criteria, wherein the first criteria is met in response to a determination that the top-K list of passages retrieved using the modified query q' is significantly different than the top-K list of passages retrieved using the original query q based on a certain threshold, and wherein the second criteria is met based on another determination that the modified query q'is a natural language question and at least one passage from the top-K list of passages associated with the modified query q' comprises a correct answer to the original query q;

based on the determination that the modified query q' meets the first criteria and the second criteria, extracting one or more properties from the top-K list of passages associated with the modified query q';

selecting, using a computed disambiguation ability as a metric, at least one property from the extracted one or more properties to use as a differentiating factor that best distinguishes retrieved content candidates from the top-K list of passages, wherein the computed disambiguation ability quantifies a success of a given one of the extracted properties in distinguishing between the retrieved content candidates and is quantified using information gain; and training the machine learning model using a training dataset comprising the original query q, the modified query q', and the differentiating factor, to generate the clarification prompt via an interactive user interface associated with the interactive system to clarify an intent of the user based on an actual under-specified query received from the user.

2. The method of claim 1, wherein the clarification prompt comprises both a follow-up clarification question for the user to answer to clarify the intent of the user and multiple options from which the user can select to clarify the intent of the user.

3. The method of claim 1, wherein modifying the original query q comprises:

dropping a modifier from the original query q to obtain the modified query q'.

4. The method of claim 3, wherein the modifier comprises a leaf node of a parse tree associated with the original query.

5. The method of claim 1, wherein modifying the original query q comprises:

generalizing a part of the original query q through a knowledge-based hierarchy.

6. The method of claim 1, wherein:

the top-K list of passages retrieved using the modified query q' is determined to be significantly different than the top-K list of passages retrieved using the original query q based on a calculated F1 score representing a differential between the top-K list of passages being below the certain threshold; and the modified query q' is determined to be the natural language question based on a generated natural language score, outputted from a language model, representing the modified query q' to be a natural language sentence.

7. The method of claim 1, further comprising:

retrieving the content candidates for the actual under-specified query from the user;

extracting differences among the content candidates, wherein the differences comprise titles, modifiers, properties, or slots;

using the machine learning model, which has been trained using the training dataset, to select one or more of the differences as differentiating factors amongst the content candidates using the computed disambiguation ability as the metric; and using the differentiating factors to generate the clarification prompt to clarify the intent of the user.

8. The method of claim 7, wherein the one or more of the properties are selected as the differentiating factor based on information gain.

9. The method of claim 7, wherein the machine learning model selects the one or more of the properties as the differentiating factor using the actual under-specified query from the user.

10. A computer program product, the computer program product comprising a computer readable storage medium having program instructions embodied therewith, the program instructions executable by a computer to cause the computer to perform:

training a machine learning model to generate a clarification prompt in an interactive system, wherein the training further comprises:

modifying an original query q in an existing question-answering dataset to generate a modified query q', wherein the modified query q' further comprises an under-specified query that is unclear based on modification of the original query;

retrieving a top-K list of passages associated with the original query q and the modified query q';

determining, based on the retrieved top-K list of passages, that the modified query q meets a first criteria and a second criteria, wherein the first criteria is met in response to a determination that the top-K list of passages retrieved using the modified query q'is significantly different than the top-K list of passages retrieved using the original query q based on a certain threshold, and wherein the second criteria is met based on another determination that the modified query q'is a natural language question and at least one passage from the top-K list of passages associated with the modified query q' comprises a correct answer to the original query q;

based on the determination that the modified query q' meets the first criteria and the second criteria, extracting one or more properties from the top-K list of passages associated with the modified query q';

selecting, using a computed disambiguation ability as a metric, at least one property from the extracted one or more properties to use as a differentiating factor that best distinguishes retrieved content candidates from the top-K list of passages, wherein the computed disambiguation ability quantifies a success of a given one of the extracted properties in distinguishing between the retrieved content candidates and is quantified using information gain; and training the machine learning model using a training dataset comprising the original query q, the modified query q', and the differentiating factor, to generate the clarification prompt via an interactive user interface associated with the interactive system to clarify an intent of the user based on an actual under-specified query received from the user.

11. The computer program product of claim 10, wherein the program instructions when causing the computer to modify the original query q further cause the computer to perform:

dropping a modifier from the original query q to obtain the modified query q'.

12. The computer program product of claim 10, the program instructions when causing the computer to modify the original query q further cause the computer to perform:

generalizing a part of the original query q through a knowledge-based hierarchy.

13. The computer program product of claim 10, wherein:

the top-K list of passages retrieved using the modified query q' is determined to be significantly different than the top-K list of passages retrieved using the original query q based on a calculated F1 score representing a differential between the top-K list of passages being below the certain threshold; and the modified query q' is determined to be the natural language question based on a generated natural language score, outputted from a language model, representing the modified query q' to be a natural language sentence.

14. The computer program product of claim 10, wherein the program instructions further cause the computer to perform:

retrieving the content candidates for the actual under-specified query from the user;

extracting differences among the content candidates, wherein the differences comprise titles, modifiers, properties, or slots;

using the machine learning model, which has been trained using the training dataset, to select one or more of the differences as differentiating factors amongst the content candidates using the computed disambiguation ability as the metric; and using the differentiating factors to generate the clarification prompt to clarify the intent of the user.

15. A system comprising a processor, connected to a memory, operable to perform:

training a machine learning model to generate a clarification prompt in an interactive system, wherein the training further comprises:

modifying an original query q in an existing question-answering dataset to generate a modified query q', wherein the modified query q' further comprises an under-specified query that is unclear based on modification of the original query;

retrieving a top-K list of passages associated with the original query q and the modified query q';

determining, based on the retrieved top-K list of passages, that the modified query q meets a first criteria and a second criteria, wherein the first criteria is met in response to a determination that the top-K list of passages retrieved using the modified query q'is significantly different than the top-K list of passages retrieved using the original query q based on a certain threshold, and wherein the second criteria is met based on another determination that the modified query q'is a natural language question and at least one passage from the top-K list of passages associated with the modified query q' comprises a correct answer to the original query q;

based on the determination that the modified query q' meets the first criteria and the second criteria, extracting one or more properties from the top-K list of passages associated with the modified query q';

selecting, using a computed disambiguation ability as a metric, at least one property from the extracted one or more properties to use as a differentiating factor that best distinguishes retrieved content candidates from the top-K list of passages, wherein the computed disambiguation ability quantifies a success of a given one of the extracted properties in distinguishing between the retrieved content candidates and is quantified using information gain; and training the machine learning model using a training dataset comprising the original query q, the modified query q', and the differentiating factor, to generate the clarification prompt via an interactive user interface associated with the interactive system to clarify an intent of the user based on an actual under-specified query received from the user.

16. The system of claim 15, wherein the processor is further operable to perform:

retrieving the content candidates for the actual under-specified query from the user;

extracting differences among the content candidates, wherein the differences comprise titles, modifiers, properties, or slots;

using the machine learning model, which has been trained using the training dataset, to select one or more of the differences as differentiating factors amongst the content candidates using the computed disambiguation ability as the metric; and using the differentiating factors to generate the clarification prompt to clarify the intent of the user.

17. The system of claim 15, wherein:

the top-K list of passages retrieved using the modified query q'is determined to be significantly different than the top-K list of passages retrieved using the original query q based on a calculated F1 score representing a differential between the top-K list of passages being below the certain threshold; and the modified query q' is determined to be the natural language question based on a generated natural language score, outputted from a language model, representing the modified query q' to be a natural language sentence.

* * * * *